United States Patent
Saunders, III

(10) Patent No.: US 7,044,282 B2
(45) Date of Patent: May 16, 2006

(54) CLUTCHLESS VISCOUS FAN DRIVE WHEREIN INPUT MEMBER SERVES AS THE BODY AND THE COVER CARRIES SEAL

(75) Inventor: Charles E. Saunders, III, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 82 days.

(21) Appl. No.: 10/903,736

(22) Filed: Jul. 30, 2004

(65) Prior Publication Data

US 2006/0021843 A1   Feb. 2, 2006

(51) Int. Cl.
*F16D 35/02* (2006.01)

(52) U.S. Cl. .............................. 192/58.682; 192/82 T; 123/41.12

(58) Field of Classification Search ............... 192/58.5, 192/58.6, 58.63, 58.68, 58.681, 58.682

See application file for complete search history.

(56) References Cited

U.S. PATENT DOCUMENTS

| | | | |
|---|---|---|---|
| 3,144,922 A | 8/1964 | Weir | |
| 4,692,053 A | 9/1987 | Sampedro | |
| 4,702,360 A * | 10/1987 | Tanaka | 192/58.682 |
| 4,874,071 A * | 10/1989 | White | 192/58.682 |
| 4,913,273 A * | 4/1990 | Mader | 192/58.682 |
| 4,949,825 A | 8/1990 | Light | |
| 4,979,601 A | 12/1990 | Hagiwara et al. | |
| 6,305,519 B1 | 10/2001 | Katoh et al. | |
| 6,561,141 B1 | 5/2003 | Stretch et al. | |
| 6,679,365 B1 | 1/2004 | Katoh et al. | |

* cited by examiner

*Primary Examiner*—Richard M. Lorence
(74) *Attorney, Agent, or Firm*—Artz & Artz, P.C.; Greg Dziegielewski

(57) ABSTRACT

A clutchless viscous fan drive system is formed in which the body of the fan drive is attached directly to the input shaft and rotates at full input speed. A seal is pressed into the cover at the output drive and seals against a cast-in seal ring on the body. The fan drive formed does not need a clutch and thus will not trap heat inside the viscous fluid chamber between the body and cover. The body rotates at full input speed with the input shaft and will improve airflow across the body side fins, therein improving fan drive cooling performance.

20 Claims, 2 Drawing Sheets

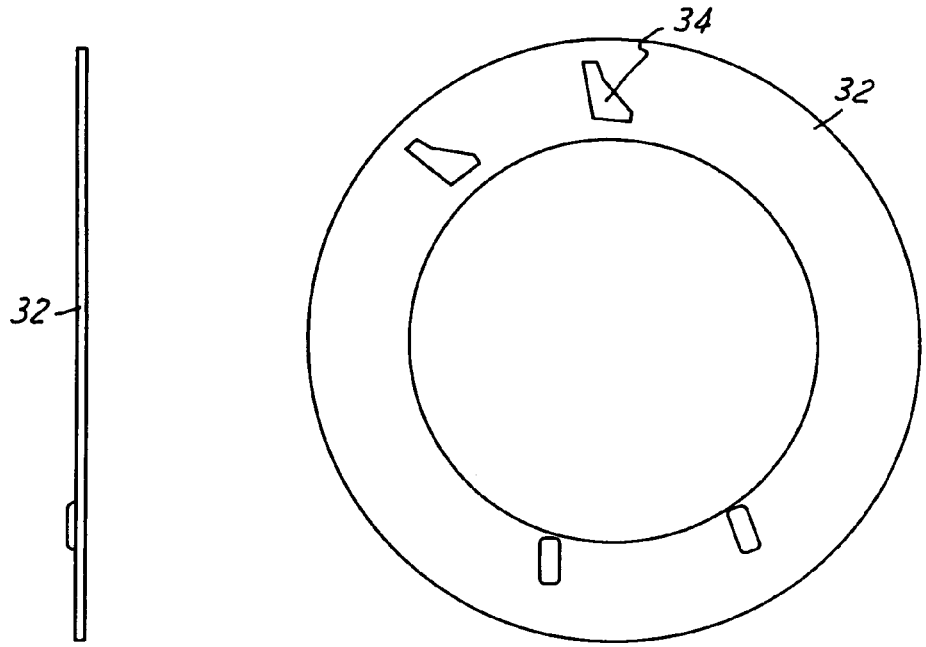
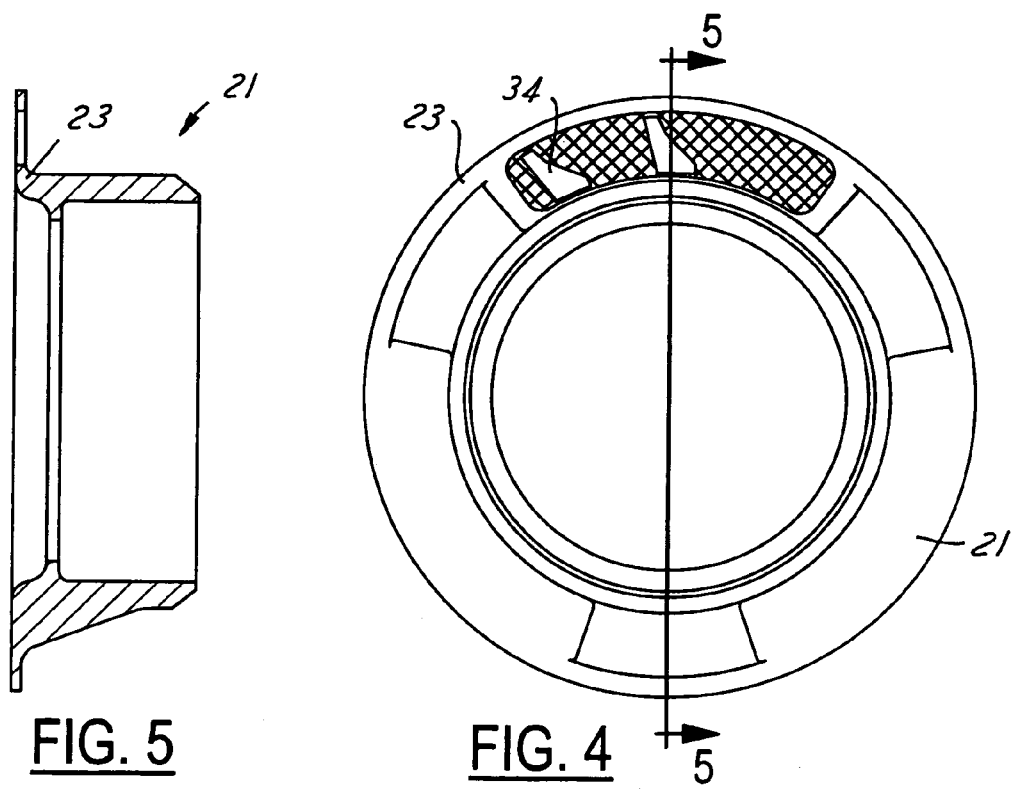

CLUTCHLESS VISCOUS FAN DRIVE WHEREIN INPUT MEMBER SERVES AS THE BODY AND THE COVER CARRIES SEAL

TECHNICAL FIELD

The invention relates generally to viscous-type fluid coupling devices and more specifically a clutchless viscous fan drive wherein the input member serves as the body and the cover carries the seal.

BACKGROUND ART

Today, most automobiles utilize a viscous-type fluid coupling device to drive the radiator-cooling fan. Traditional viscous-type fluid coupling devices include an input coupling member and an output coupling assembly. The output coupling assembly includes a die-cast housing member (body), and a die-cast cover member (enclosure), the members being secured together by a rollover of the outer periphery of the cover member.

The fluid coupling device is adapted to be driven by the engine, and in turn, drives the radiator-cooling fan. The fan may be attached to the housing member by any suitable means.

The input coupling assembly typically includes a central shaft on which a clutch, or clutch plate is mounted. The input coupling assembly is typically either coupled directly to the engine crankshaft or indirectly to the crankshaft via a belt and pulley system, wherein the pulley is coupled to a hub that is coupled to the input coupling assembly. The pulley may also be coupled to an externally threaded waterpump shaft. The assembly functions as a support for the inner race of a bearing set, which is seated on the inside diameter of the housing member. The rotation of the input coupling assembly thus causes rotation of the input coupling assembly and waterpump shaft (if utilized).

The housing member and the cover member cooperate to define a fluid chamber, which is separated into a fluid operating chamber and a fluid reservoir chamber by the clutch and a reservoir plate. The fluid reservoir chamber is thus defined by the cover member and reservoir plate, while the fluid operating chamber is defined by the clutch and housing member. The reservoir plate is operatively coupled with the innermost end of the actuator shaft and contains a fill port through which viscous fluid flows from the fluid reservoir chamber to the fluid operating chamber.

Disposed adjacent the radially outer periphery of the operating chamber, the cover member includes a pumping element, also referred to as a "wiper" element, operable to engage the relatively rotating fluid in the operating chamber, and generate a localized region of relatively higher fluid pressure. As a result, the pumping element continually pumps a small quantity of fluid from the operating chamber back into the reservoir chamber through a radial passage defined by the cover member, in a manner well known in the art.

As one of ordinary skill recognizes, the output, or torque, to the body and cover in these systems is thus a function of the rotational speed of the clutch and the amount of viscous fluid contained within the working chamber. Further, a bimetallic element, or a valve arm capable of electronic control, is positioned near the fill port of the reservoir plate and controls the amount of viscous fluid flowing from the reservoir chamber to the working chamber. This allows for precise control of the torque output of the fan drive to the coupled fan blades at any given engine speed.

One problem with traditional viscous-type fluid coupling devices used to drive fans is the complexity of the system. A clutch is contained within the body and cover is required to drive the output. The clutch, and any associated parts, are expensive to manufacture and build and may be a source for failure within an automobile. It is thus highly desirable to simplify the design of viscous type fan drives.

SUMMARY OF THE INVENTION

The above objects are accomplished by simplifying the design of the viscous-type fluid-coupling device used to drive a fan. In a preferred embodiment of the present invention, a clutchless viscous fan drive system is formed in which the body of the fan drive is attached directly to the input shaft and rotates at full input speed. A seal is pressed into the cover at the output drive and seals against a cast-in seal ring on the body.

The fan drive formed does not need a clutch and thus will not trap heat inside the viscous fluid chamber between the body and cover. The body rotates at full input speed with the input shaft and will improve airflow across the body side fins, therein improving fan drive cooling performance.

Other features, benefits and advantages of the present invention will become apparent from the following description of the invention, when viewed in accordance with the attached drawings and appended claims.

BRIEF DESCRIPTION OF THE DRAWINGS

FIGS. 2 and 3 are a front and side view, respectively, of the pump plate of FIG. 1;

FIG. 4 is a perspective view of the bearing housing of FIG. 1; and

FIG. 5 is a section view of FIG. 4 taken along line 5—5.

BEST MODE(S) FOR CARRYING OUT THE INVENTION

Figure 1:
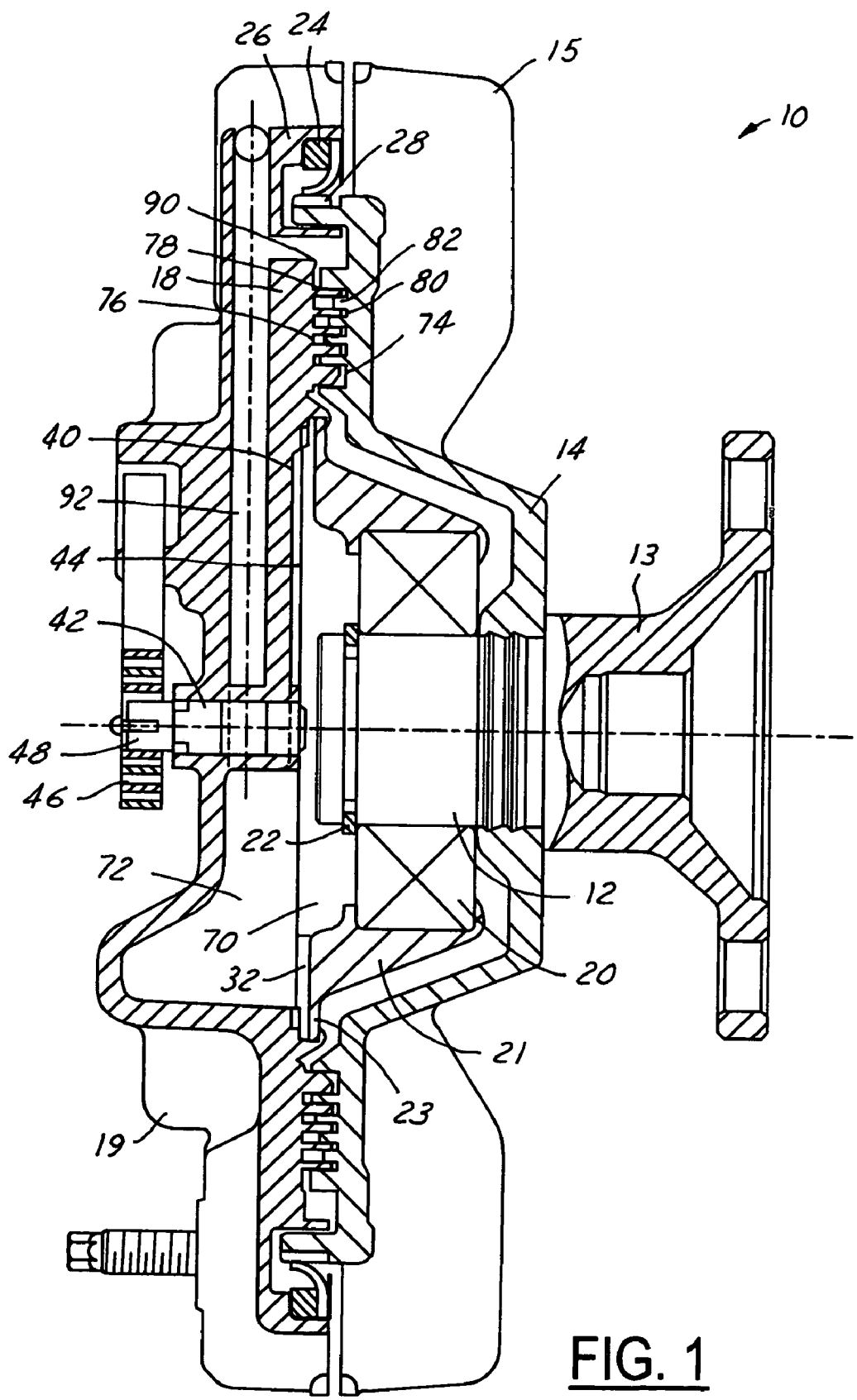
FIG. 1 is a section view of a clutchless, viscous-type fan drive assembly according to a preferred embodiment of the present invention.

FIGS. 1–5 describe a clutchless, viscous-type fan drive assembly 10 made in accordance with one preferred embodiment of the present invention.

The fan drive assembly 10 includes an input shaft 12 that is coupled directly or indirectly to the engine crankshaft (not shown). The input shaft 12 is coupled directly to the body 14 of the fan drive assembly 10 and to a rotating component (of the engine at its opposite end) via a flange portion 13. Thus, the body 14, which has a plurality of body side fins 15, rotates as a function of engine speed as translated rotationally to the engine crankshaft (i.e. input speed) and provides cooling airflow for the fan drive assembly 10.

The fan drive assembly 10 also has a cover 18 that is rotatably mounted to the input shaft 12 utilizing a bearing 20 having a bearing housing 21. A spring ring clip 22 keeps the input shaft 12 from pulling out of the bearing 20 and body 14.

The cover 18 has a seal, preferably a varilip style seal 24, pressed into the cover at its outer diameter 26. The varilip style seal 24 seals against a cast-in steel ring 28 formed on a portion of the body 14. The cover 18 and body 14 therefore define a chamber 70 there within. The cover 18 may be coupled to an associated fan (not shown) having a plurality of fan blades (not shown). The cover 18 also has a plurality of cooling side fins 19 that are used to cool the radiator (not shown).

A pump plate 32 having one or more fill ports 34 (shown best in FIG. 2) is coupled between an inner surface 40 of the cover 18 within the chamber 70 and the end 23 of the bearing housing 21 (shown also in FIG. 3). Thus, the chamber 70 is subdivided into a fluid reservoir 72 defined by the pump plate 32 and cover 18.

The chamber 70 is further subdivided into an operating chamber 74, defined between the lands 76 and grooves 78 formed on a portion of the cover 18 and the lands 80 and grooves 82 formed on a portion of the body 14. The fill port(s) 34 fluidically couple the fluid reservoir 72 to the operating chamber 74.

Disposed adjacent the radially outer periphery of the operating chamber 74, the cover member 18 includes a pumping element 90, also referred to as a "wiper" element, operable to engage the relatively rotating fluid in the operating chamber 74, and generate a localized region of relatively higher fluid pressure. As a result, the pumping element 90 continually pumps a small quantity of fluid from the operating chamber 74 back into the reservoir chamber 72 through a radial passage 92 defined by the cover member 18, in a manner well known in the art.

A valve shaft 42 that is rotationally mounted within the cover 18 couples a valve arm 44 to a bimetallic control element 46. An o-ring 48 seals the valve shaft 42 to the cover 18. The end 46 of the valve arm 44 covers and uncovers the fill ports 34 depending upon the relative rotational positioning of the valve arm 44 as determined by the bimetallic control element 46. Preferably, the valve arm 44 is maintained in a position covering the fill port 34.

The bimetallic control element 46, here shown as a bimetallic coil, senses engine temperature through conduction. As engine temperature increases above a predetermined threshold temperature, the bimetallic control element 46 correspondingly heats up. The extra heat causes the coil 46 to expand and uncoil, which causes the coupled valve shaft 42 and valve arm 44 to rotate in response to a position to uncover the fill port 34, thereby allowing fluid flow from the fluid reservoir 72 to the working chamber 74. This increases the amount of viscous fluid in the working chamber 74 due to flow rate through the fill port 34, thereby generating shear force to drive the cover 18. The cover 18 and its fins 19 rotate more quickly, therein generating airflow to help cool the coolant within the closely coupled radiator, and hence cool the engine.

Below the threshold engine temperature, the bimetallic control element 46 contracts to its original shape, therein causing the rotation of the valve shaft 42 and valve arm 44 to cover the fill hole 34, thereby preventing the flow of viscous fluid from the fluid reservoir 72 to the operating chamber 74. This decreases the amount of viscous fluid, and hence the shear created within the working chamber 74. This decreases the amount of torque generated to rotate the cover 18 and fins 19. This in turn decreases the airflow used to cool coolant within the radiator.

As one of ordinary skill in the art recognizes, the threshold engine temperature for expanding and unrolling the bimetallic control element 46 is dependent upon numerous factors. For example, the relative location of the bimetallic control element 46, and the clutchless fan drive assembly 10 in general, to the engine block has a significant effect. Further, the composition, thickness, and shape of the bimetallic control element also affect the threshold engine temperature. For example, a thinner element would more readily expand and rotate. Thus, a person of ordinary skill can precisely control the opening and closing of the fill port 34 by the valve arm 44 at a precisely controlled engine temperature.

Of course, in alternative embodiments (not shown), the valve arm 44 could be situated to prevent or allow the flow of viscous fluid from the working chamber 74 to the fluid reservoir 72 via a return line, instead of covering or uncovering the fill port, and still fall within the scope of the present invention.

The main advantage of the present invention is that the absence of a clutch within the body and cover substantially prevents heat buildup within the interior of the clutch. The clutchless fan drive would not have to transfer the heat out of the fan drive through the viscous fluid and out the fins like in currently available clutched fan drives. Also, because the body is rotating at full input speed, improved airflow across the body side fins is realized compared to improve cooling efficiency as compared with clutched fan drives.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A viscous fan drive for cooling an engine, the viscous fan drive comprising:
   an input member comprising an input shaft and a body, said body having a seal ring, said input member rotating as a function of a given engine speed;
   an output member bearing supported around said input shaft, said output member comprising a cover;
   a seal pressed into said cover and sealingly engaged to said body,
   a chamber defined by said body, said cover, and said seal;
   a pump plate coupled to said output member and contained within said chamber, said pump plate having a fill port;
   a fluid reservoir defined by said pump plate and said cover;
   an operating chamber defined by said cover and said body, said operating chamber fluidically coupled to said fluid reservoir through said fill port; and
   a quantity of viscous fluid contained within said fluid reservoir and said operating chamber,
   wherein the relative amount of said quantity of viscous fluid within said operating chamber controls the torque engagement of said output member at a given rotational speed of said input member.

2. The viscous fan drive of claim 1, further comprising:
   a bimetallic control element coupled to said cover, said bimetallic control element capable of rotating as a function of the engine operating temperature;
   a valve shaft coupled to said bimetallic control element and extending through said cover to said chamber, said valve shaft capable of rotating with said bimetallic control element;
   an o-ring seal sealingly coupled around said valve shaft and to said cover, and
   a valve arm coupled to said valve shaft, said valve arm capable of rotating with said valve shaft to cover and uncover said fill port,
   wherein the relative position of said valve arm controls said relative amount of said quantity of viscous fluid contained in said operating chamber at said given rotational speed of said input member.

3. The viscous fan drive of claim 2, wherein said valve arm substantially covers said fill port when the engine operating temperature is below a predetermined threshold temperature and substantially uncovers said fill port when the engine operating temperature is above said predetermined threshold temperature.

4. The viscous fan drive of claim 2, wherein said valve arm substantially covers said fill port when the engine operating temperature is below a predetermined threshold temperature to prevent flow of said quantity of viscous fluid from said fluid reservoir to said operating chamber, therein minimizing said relative amount of said quantity of viscous fluid within said operating chamber and minimizing said torque engagement of said output member at a given rotational speed of said input member.

5. The viscous fan drive of claim 2, wherein said valve arm substantially uncovers said fill port when the engine operating temperature is above a predetermined threshold temperature to allow maximum flow of said quantity of viscous fluid from said fluid reservoir to said operating chamber, therein maximizing said relative amount of said quantity of viscous fluid within said operating chamber and maximizing said torque engagement of said output member at a given rotational speed of said input member.

6. The viscous fan drive of claim 2, wherein said bimetallic control element comprises a coil.

7. The viscous fan drive of claim 1, said body having a plurality of body side fins.

8. The viscous fan drive of claim 1, wherein said cover has a plurality of cover side fins.

9. A method for controlling engine temperature at a given engine speed comprising:
  (a) forming a viscous fan drive comprising:
    an input member comprising an input shaft and a body, said body having a seal ring, said input member rotating as a function of the given engine speed;
    an output member bearing supported around said input shaft, said output member comprising a cover;
    a seal pressed into said cover and sealingly engaged to said body,
    a chamber defined by said body, said cover, and said seal;
    a pump plate coupled to said output member and contained within said chamber, said pump plate having a fill port;
    a fluid reservoir defined by said pump plate and said cover;
    an operating chamber defined by said cover and said body, said operating chamber fluidically coupled to said fluid reservoir through said fill port; and
    a quantity of viscous fluid contained within said fluid reservoir and said operating chamber; and
  (b) controlling a relative amount of said quantity of viscous fluid contained in said operating chamber at the given engine speed, wherein said relative amount of said quantity of viscous fluid is directly proportional to a torque response of said output member.

10. The method of claim 9, wherein said viscous fan drive further comprises:
  a bimetallic control element coupled to said cover, said bimetallic control element capable of rotating as a function of the engine operating temperature;
  a valve shaft coupled to said bimetallic control element and extending through said cover to said chamber, said valve shaft capable of rotating with said bimetallic control element;
  an o-ring seal sealingly coupled around said valve shaft and to said cover, and
  a valve arm coupled to said valve shaft, said valve arm capable of rotating with said valve shaft to cover and uncover said fill port, wherein the relative position of said valve arm controls said relative amount of said quantity of viscous fluid contained in said operating chamber at said given rotational speed of said input member.

11. The method of claim 10, wherein (b) controlling a relative amount of said quantity of viscous fluid contained in said operating chamber at the given engine speed comprises:
  (b) substantially covering said fill port with said valve arm when the engine operating temperature is below a predetermined threshold temperature and substantially uncovering said fill port with said valve arm when the engine operating temperature is above said predetermined threshold temperature.

12. The method of claim 10, wherein (b) controlling a relative amount of said quantity of viscous fluid contained in said operating chamber at the given engine speed comprises:
  (b) substantially covering said fill port with said valve arm when the engine operating temperature is below a predetermined threshold temperature to prevent flow of said quantity of viscous fluid from said fluid reservoir to said operating chamber, therein minimizing said relative amount of said quantity of viscous fluid within said operating chamber and minimizing said torque response of said output member at a given rotational speed of said input member.

13. The method of claim 10, wherein (b) controlling a relative amount of said quantity of viscous fluid contained in said operating chamber at the given engine speed comprises:
  (b) substantially uncovering said fill port with said valve arm when the engine operating temperature is above said predetermined threshold temperature, therein maximizing said relative amount of said quantity of viscous fluid within said operating chamber and maximizing said torque response of said output member at a given rotational speed of said input member.

14. A method for operating a viscous type fan drive having improved airflow characteristics and minimal heat buildup, the method comprising:
  (a) forming a viscous fan drive comprising:
    an input member comprising an input shaft and a body, said body having a seal ring, said input member rotating as a function of a given engine speed;
    an output member bearing supported around said input shaft, said output member comprising a cover;
    a seal pressed into said cover and sealingly engaged to said body,
    a chamber defined by said body, said cover, and said seal;
    a pump plate coupled to said output member and contained within said chamber, said pump plate having a fill port;
    a fluid reservoir defined by said pump plate and said cover;
    an operating chamber defined by said cover and said body, said operating chamber fluidically coupled to said fluid reservoir through said fill port; and
    a quantity of viscous fluid contained within said fluid reservoir and said operating chamber;

(b) coupling said input member to a rotating component of an engine such that said input member rotates with said rotating component, said rotating component rotating as a function of the given engine speed; and (c) controlling a relative amount of said quantity of viscous fluid contained in said operating chamber at the given engine speed, wherein said relative amount of said quantity of viscous fluid is directly proportional to a torque response of said output member.

15. The method of claim 14, wherein said viscous fan drive further comprises:

a bimetallic control element coupled to said cover, said bimetallic control element capable of rotating as a function of the engine operating temperature;

a valve shaft coupled to said bimetallic control element and extending through said cover to said chamber, said valve shaft capable of rotating with said bimetallic control element;

an o-ring seal sealingly coupled around said valve shaft and to said cover, and a valve arm coupled to said valve shaft, said valve arm capable of rotating with said valve shaft to cover and uncover said fill port, wherein the relative position of said valve arm controls said relative amount of said quantity of viscous fluid contained in said operating chamber at said given rotational speed of said input member.

16. The method of claim 14, wherein (c) controlling a relative amount of said quantity of viscous fluid contained in said operating chamber at the given engine speed comprises:

(c) substantially covering said fill port with said valve arm when the engine operating temperature is below a predetermined threshold temperature and substantially uncovering said fill port with said valve arm when the engine operating temperature is above said predetermined threshold temperature.

17. The method of claim 14, wherein (b) coupling said input member to a rotating component of an engine comprise (b) coupling said input shaft to a rotating component of an engine.

18. The method of claim 14, wherein (b) coupling said input member to a rotating component of an engine comprise (b) coupling a flange portion of said input shaft to a rotating component of an engine.

19. The method of claim 14, wherein (c) controlling a relative amount of said quantity of viscous fluid contained in said operating chamber at the given engine speed comprises:

(c) substantially covering said fill port with said valve arm when the engine operating temperature is below a predetermined threshold temperature to prevent flow of said quantity of viscous fluid from said fluid reservoir to said operating chamber, therein minimizing a relative amount of said quantity of viscous fluid within said operating chamber and minimizing said torque response of said output member at a given rotational speed of said input member.

20. The method of claim 14, wherein (c) controlling a relative amount of said quantity of viscous fluid contained in said operating chamber at the given engine speed comprises:

(c) substantially uncovering said fill port with said valve arm when the engine operating temperature is above said predetermined threshold temperature, therein maximizing a relative amount of said quantity of viscous fluid within said operating chamber and maximizing said torque given rotational speed of said input member.

* * * * *